United States Patent
Coates et al.

(10) Patent No.: US 9,452,600 B2
(45) Date of Patent: Sep. 27, 2016

(54) IN-FEED SYSTEM AND METHOD FOR SUPPLYING CAN BODIES TO A DECORATOR

(71) Applicant: Crown Packaging Technology, Inc., Alsip, IL (US)

(72) Inventors: Michael Jonathan Coates, West Yorkshire (GB); Daniel Egerton, North Yorkshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 0 days.

(21) Appl. No.: 14/760,078

(22) PCT Filed: Jan. 10, 2014

(86) PCT No.: PCT/EP2014/050357
§ 371 (c)(1),
(2) Date: Jul. 9, 2015

(87) PCT Pub. No.: WO2014/108489
PCT Pub. Date: Jul. 17, 2014

(65) Prior Publication Data
US 2015/0336750 A1    Nov. 26, 2015

(30) Foreign Application Priority Data
Jan. 11, 2013 (EP) .................................... 13151052

(51) Int. Cl.
| | |
|---|---|
| *B65G 47/84* | (2006.01) |
| *B41F 17/00* | (2006.01) |
| *B65G 37/00* | (2006.01) |
| *B65G 29/00* | (2006.01) |
| *B41F 17/22* | (2006.01) |

(52) U.S. Cl.
CPC ............. *B41F 17/002* (2013.01); *B41F 17/22* (2013.01); *B65G 29/00* (2013.01); *B65G 37/00* (2013.01); *B65G 47/846* (2013.01); *B65G 2201/0235* (2013.01)

(58) Field of Classification Search
CPC ........................... B65G 47/846; B65G 47/848
See application file for complete search history.

(56) References Cited

U.S. PATENT DOCUMENTS

| | | | |
|---|---|---|---|
| 3,613,571 A | 10/1971 | Russell et al. | |
| 4,048,917 A | 9/1977 | Skrypek et al. | |
| 7,530,444 B2 * | 5/2009 | Draghetti | B65G 29/00 198/474.1 |
| 9,033,132 B2 * | 5/2015 | Goeb | B65G 47/848 198/608 |
| 2012/0216689 A1 * | 8/2012 | Cochran | B41F 17/22 101/39 |
| 2013/0154164 A1 * | 6/2013 | Laumer | B29C 49/4205 264/535 |
| 2013/0216333 A1 * | 8/2013 | Wilson | B21D 22/00 413/1 |

FOREIGN PATENT DOCUMENTS

WO    WO 2011/113710    9/2011

* cited by examiner

*Primary Examiner* — Thomas Randazzo
(74) *Attorney, Agent, or Firm* — Baker & Hostetler LLP

(57) ABSTRACT

An infeed system for a can body decorator in which undecorated can bodies are transported from an upstream supply in a conveyor (21). In the conveyor (21), the can bodies have a linear pitch as they are touching each other. One or more infeed turrets (22, 23; 25, 27; 28, 9, 3) separate each can body and change the pitch to the circular pitch of a separator turret and, ultimately to that of the mandrel wheel (10) in the decorator assembly.

3 Claims, 3 Drawing Sheets

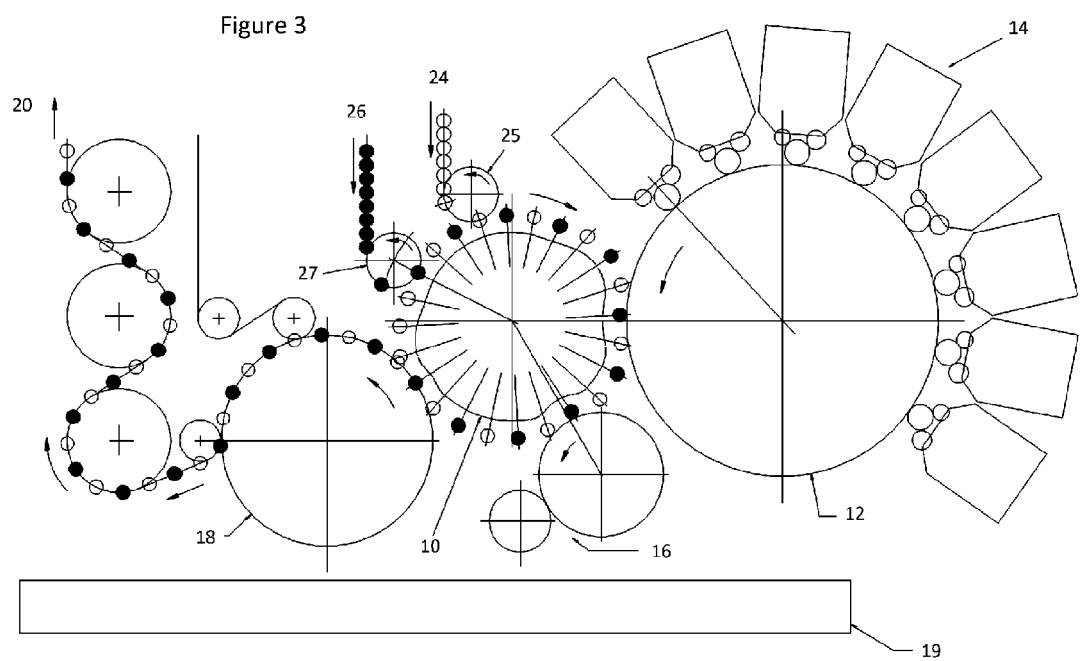

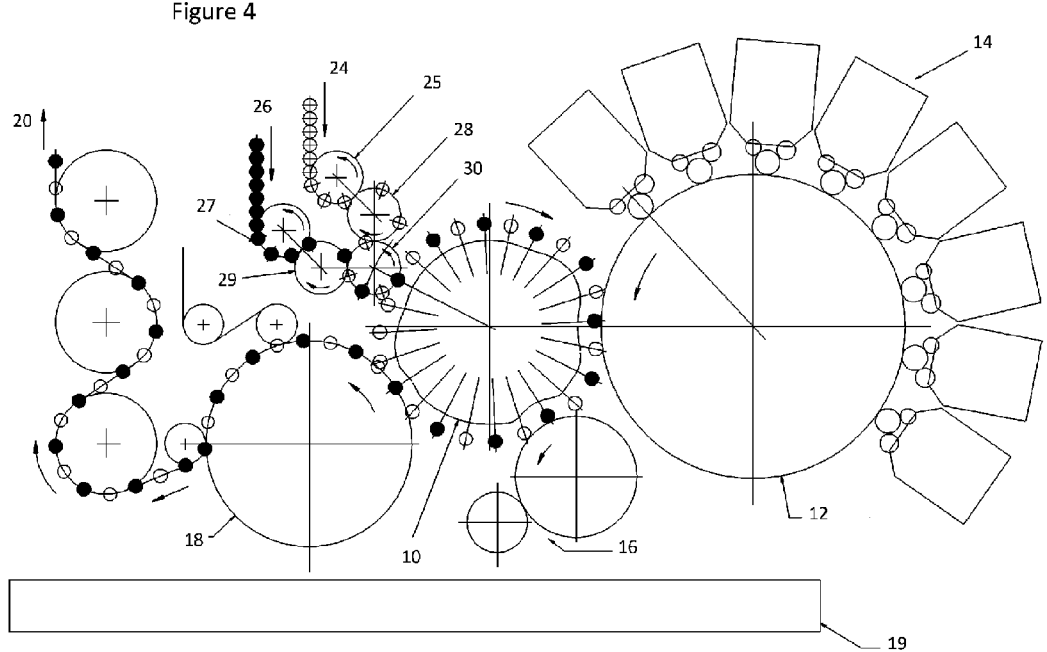

IN-FEED SYSTEM AND METHOD FOR SUPPLYING CAN BODIES TO A DECORATOR

CROSS-REFERENCE TO RELATED APPLICATIONS

This application is the National Stage of International Application No. PCT/EP2014/050357, filed Jan. 10, 2014, which claims the benefit of EP application number 13151052.1, filed Jan. 11, 2013, the disclosures of which are incorporated herein by reference in their entirety.

TECHNICAL FIELD

This invention relates to an infeed system for supplying undecorated can bodies to a can body decorator. In particular, but not exclusively, it relates to a combination of one or more conveyors, infeed separator turrets and transfer turrets which together change the can pitch to that of a mandrel wheel assembly (sometimes referred to as a "spindle disc") in the can body decorator. For the avoidance of doubt, the term "decorator" is intended to include the application of any kind of decoration, print, coloured inks or varnish onto a can body which is typically formed from tin free steel, aluminium or other metal. The term "can" is used herein to mean the can body prior to filling and closing to form a finished can.

BACKGROUND ART

U.S. Pat. No. 4,138,041 (COORS CONTAINER COMPANY) describes a gravity infeed through an inclined chute to stationary pockets on a rotatable pocket mandrel wheel. There, the cans are drawn from the pockets and seated by vacuum on mandrels which carry the cans to a printing blanket cylinder.

As it has become important to increase machine speed, a single stack of cans as in the gravity infeed of U.S. Pat. No. 4,138,041 cannot keep up with the speed of the machine, and cannot rely on gravity alone. Air pressure could be used to force the cans downwards but as the speed increases, the use of more air pressure causes can distortion.

Decorating machinery has been employed by companies such as Rutherford and Alcoa in the printing of metal cans. A known 24 mandrel decorator operates at typically 1800 cans per minute ("cpm") and a 36 mandrel decorator operates at typically 2000 cpm. The single lane infeed of these decorators has been needed to control the speed of the cans and is a limitation of machine production speed.

Conventionally, a continuous stream of cans is fed from conveyor track work into the infeed section of the can body decorator. In a conveyor stack, the can bodies have a linear "pitch" which is the distance between their centres, i.e. one can diameter. Individual cans are separated from the conveyor stack by a pocketed single rotating turret wheel. There are two types of infeed separator turret, constant velocity ('CV') and 'tangential'. The type of feed refers to the point where the can is fed from the conveyor stack onto the infeed separator turret. The challenge for a rotary machine infeed system when feeding cans to any container manufacturing process is that the machine takes delivery of cans which are spaced or "pitched" in a linear fashion and the infeed system must change the pitch between the can bodies to that of a circular turret—and larger pitch.

Following exchange to the separator turret, cans are accelerated up to the peripheral speed of the turret wheel. In known decorators, a further pitch change occurs between the infeed separator turret and mandrel wheel circular pitch. The can body sits in a pocket on this mandrel wheel and is then sucked across using vacuum onto a mandrel. The actual time for this transfer before printing starts is fairly short, especially if the can body is long. The pitch change onto the mandrel wheel has been found to cause can stability problems when misalignment of a can with the corresponding mandrel causes unsuccessful loading. If the can body is not loaded onto the mandrel correctly prior to commencing printing, it has to be blown off. It is apparent that poorly loaded can bodies are rejected and result in spoilage.

Some machine manufacturers omit the infeed separator turret and guide the can onto a profiled "Can Carrier Pocket" which is mounted in front of a mandrel (the mandrel is part of the mandrel wheel), which has the function of changing can conveyor pitch to that of the mandrel wheel circular pitch.

A rotary machine infeed system for a can body die necker is described in WO 2011/113710 (CROWN PACKAGING, INC). However, in this prior art system, the can bodies are always already decorated prior to being necked. The skilled man would not consider trying this necker infeed system for handling the undecorated cans of the present invention because undecorated cans do not convey well at high speeds, since the chemicals used in the can washer upstream of the decorator infeed, affect the surface of the cans. This means that the friction properties will vary—strong etching in the washer causes high friction and the cans do not slide against each other as expected. Use of so-called "mobility enhancer" can help, but it is expensive.

The cans coming into the decorator are "open-ended" or "un-necked" which means that they are not stiff. The cans tend to come into the machine in a long stack of cans which can cause distortion of a can and hang-up on the in-feed guides, and subsequent difficulty in feeding can bodies of unexpected (distorted) shape into the infeed turret. The critical part of an infeed system is when the flexible can body is loaded onto the mandrel. It is therefore desirable that the can body is stable at this point, so as to give minimum spoilage. By having a pitch increase as in conventional infeed systems, the can is not stable and as a result the loading of the can is not 100% reliable.

It is conventional for current decorator turrets at infeed to hold cans in turret pockets by means of vacuum, applied at the can outside diameter.

U.S. Pat. No. 3,613,571 (BROWN MACHINE COMPANY OF MICHIGAN, INC.) describes a container printing machine and method of printing which seeks to provide printing machines capable of running at speeds which may print containers at the rate of as much as 400 cans per minute on each side of a mandrel drum. There is no mention as to how cans are held on the infeed starwheel, nor of any can pitch change through the infeed system.

U.S. Pat. No. 4,048,917 (SUN CHEMICAL CORPORATION) 20, Sep. 1977 is a continuous can printer which is constructed with a worm and star-wheel type input conveyor. Infeed spirals or lead screws such as those described in U.S. Pat. No. 4,048,917 and also U.S. Pat. No. 3,766,851 (SUN CHEMICAL CORPORATION) 23, Oct. 1973, to which U.S. Pat. No. 4,048,917 refers, is old technology and has speed limitations. This is exacerbated by the aspect ratio of some cans. Although U.S. Pat. No. 3,766,851 refers to operation at very high speeds, no actual speed is given and the worm and star-wheel construction of the printer at that time would have prevented its use at line speeds anything like as high as 1000 cans per minute.

SUMMARY OF INVENTION

According to the present invention, there is provided an infeed apparatus for supplying can bodies to a can body decorator, the infeed apparatus comprising: a conveyor which transports can bodies from an upstream supply; a rotatable mandrel wheel which receives each can body in a pocket on the circumference of the wheel; characterised in that the can bodies are supplied undecorated; and the apparatus includes one or more infeed turrets having a circular pitch and a separator turret which separates each can body received from the conveyor, whereby linear can pitch on the conveyor is changed to a circular can pitch on the infeed turret(s); and a transfer turret for transferring can bodies to the mandrel wheel; whereby can pitch between conveyor and mandrel wheel is changed in one or more stages and handling of the undecorated can bodies is controlled.

An object of the infeed apparatus is to be able to handle undecorated cans at high line speeds, the aim being to handle 1000 cans per minute, or even beyond that, on each conveyor lane, with a fraction of the hardware which is about the mandrel drum of U.S. Pat. No. 3,613,571. Preferably the transfer turret has a circular pitch which is identical to that of the mandrel wheel whereby the can stability is improved for loading. Staging the can pitch change between conveyor and mandrel wheel improves the stack 'behaviour' by lowering the magnitude of stack shunting.

Preferably, the apparatus further comprises two or more conveyors; each conveyor having an accompanying separator turret, which changes the can pitch from that of the conveyor to that of the separator turret, the conveyor and accompanying separator turret providing an independent conveyor lane which feeds directly to the mandrel wheel; each conveyor lane feed being selected to supply a specific sequence of can carrier pockets on the mandrel wheel.

This embodiment reduces the speed of transfer from each infeed conveyor stack but requires a large pitch change between the infeed conveyor stack and the mandrel wheel circular pitch for a single infeed turret which could be mitigated by the addition of further turrets to accompany each separator turret. Multiple independent conveyor lanes and accompanying infeed turrets feeding directly into the mandrel wheel assembly compromises the mandrel loading time.

Ideally, the infeed apparatus further comprises: two or more conveyors, each conveyor having an accompanying separator turret, which changes the can pitch from that of the conveyor to that of the separator turret; and each conveyor and accompanying separator turret providing an independent supply lane; each independent supply lane including a further infeed turret which further changes the pitch of the can bodies; a combiner turret which combines the supply lanes together on one turret, the pitch on the combiner turret and the can carrier pocket pitch on the mandrel wheel being identical, such that each conveyor lane supplies a specific sequence of can carrier pockets on the mandrel wheel.

This final embodiment has the advantages of (i) reducing the speed of the infeed conveyor stack, thus leading to higher machine production speed; (ii) exchanging onto the mandrel wheel assembly ("spindle disc") without can pitch change between combiner turret and can carrier pocket, thereby improving can stability for mandrel loading; and (iii) not compromising (i.e. optimising) mandrel loading time.

According to another aspect of the present invention, there is provided a method of feeding can bodies to a can body decorator as defined in the claims.

BRIEF DESCRIPTION OF DRAWINGS

Preferred embodiments of the invention will now be described with reference to the accompanying drawings, in which:

FIG. 3 is a schematic side view of a second infeed system according to the invention; and FIG. 4 is a schematic side view of a third infeed system according to the invention.

DESCRIPTION OF EMBODIMENTS

Figure 1:
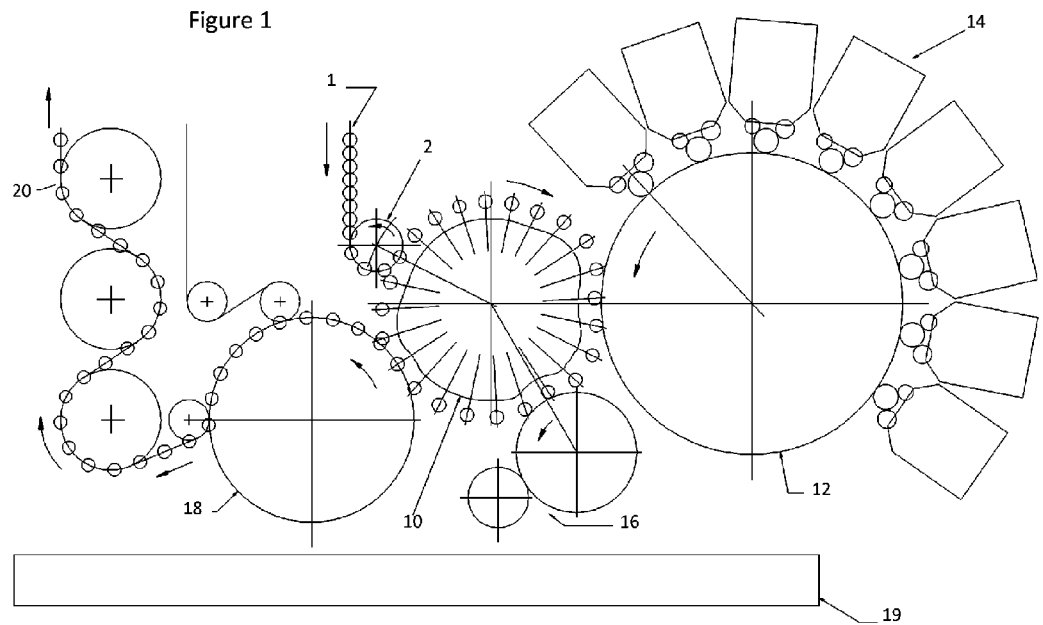
FIG. 1 is a schematic side view of a conventional infeed system.

FIG. 1 shows a known infeed system and associated decorator. The infeed system comprises a conveyor stack 1 in which can bodies are stacked and thereby in contact with each other and having a linear pitch. An infeed separator turret 2 separates and re-pitches the can bodies from the stack 1. It is apparent from FIG. 1 that there is a pitch change inherent in the change from the linearly pitched stack to the separator turret 2 and, additionally, in the transfer from the infeed separator turret 2 to the mandrel wheel assembly 10 of the can body decorator.

Although not featured in the conventional system of FIG. 1, some machine manufacturers omit the infeed separator turret and guide the can onto a profiled "can carrier pocket" which is mounted in front of the mandrel. The mandrel is part of the mandrel wheel assembly (cf. 10) and the can carrier pocket has the function of changing can conveyor pitch to that of the mandrel wheel circular pitch.

The remainder of the features shown in FIG. 1, including the mandrel wheel assembly or spindle disc 10, form part of the decorator which is mounted on a machine base represented as rectangular block 19.

In the decorator of FIG. 1, cans are transferred onto individual mandrels on the spindle disc as noted above. The spindle disc 10 of FIG. 1 rotates in a clockwise direction and follows a pre-determined cam profile. This decorator includes blanket drum 12 which rotates in the opposite direction to the mandrel wheel assembly so as to bring the blanket drum 12 into contact with plate cylinders. Each plate cylinder rotates and as it does so it receives a thin coat of ink from inker assemblies ("inker stations") 14. A single colour of ink is applied to each plate cylinder, with the final printed design being a composite image of all the plate cylinders in use.

As the different blankets on the drum 12 make contact with individual plate cylinders, the design is applied to each blanket in stages before the blanket makes contact with the can, thereby printing the finished design onto the can. While the can is spinning, the mandrel wheel assembly 10 brings the can into contact with an applicator roll of the overvarnish unit 16 which applies a coat of varnish to protect the printed design. The finished can is then transferred from the spindle disc 10 to a transfer disc ("disc transfer wheel") 18. The transfer disc 18 rotates in an anti-clockwise direction and takes the can to a position where it can be transferred to a pin chain discharge 20. The can is subsequently released and finally transferred to a drying oven (not shown).

Figure 2:
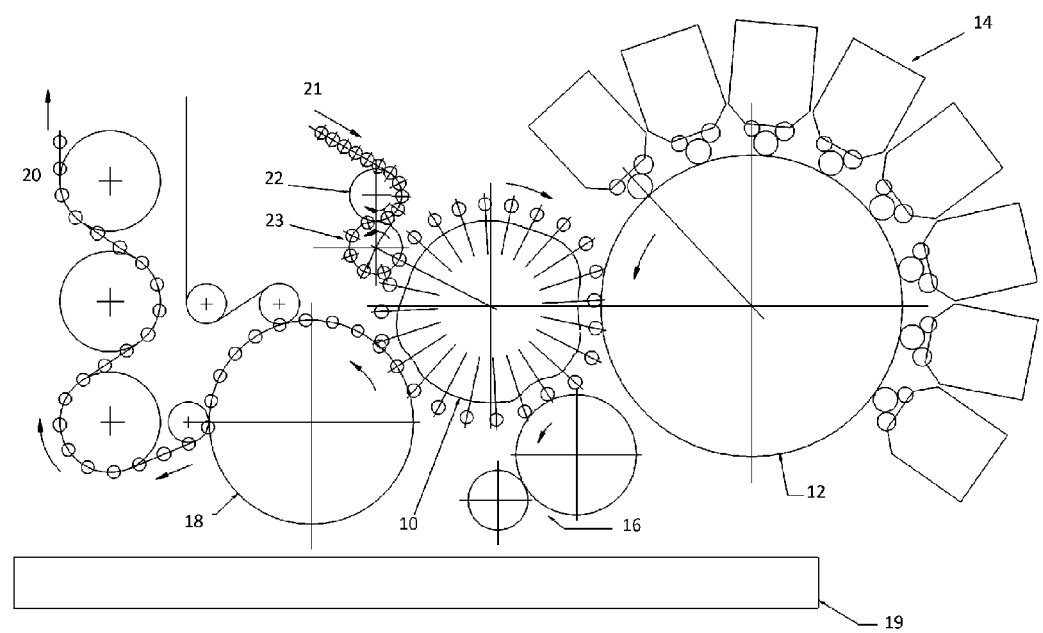
FIG. 2 is a schematic side view of a first infeed system according to the invention.

FIGS. 2 to 4 are alternative infeed systems of the present invention. Each of FIGS. 2 to 4 include the same or similar schematic decorator as that of FIG. 1, including mandrel wheel assembly 10. These individual features have been described above and will not be described in any detail hereinafter.

FIG. 2 infeed system has a single conveyor stack 21 which feeds two or more infeed turrets. In the figure infeed separator turret 22 changes the linear can pitch from the conveyor stack pitch to circular pitch of the separator turret 22 with further increase in circular can pitch at the exchange onto the infeed transfer turret 23. Additional transfer turrets may be used if further exchange and staged pitch changes are required. The circular pitch of the final transfer turret 23 is identical to that of the mandrel wheel assembly. There is thus no change in the circular pitch of the can when it is transferred from the infeed system to the mandrel wheel assembly of the can body decorator.

The infeed system of FIG. 3 uses two or more pairs of infeed conveyor stacks 24, 26 and associated separator turrets (25 and 27 respectively). Each can undergoes a change in pitch between the stack and associated separator turret. Each combination of stack and separator turret is referred to as an independent "conveyor lane" which feeds directly to the mandrel wheel, with each conveyor lane feed being selected to supply a specific sequence of can carrier pockets on the mandrel wheel 10. Thus in the two conveyor lanes of FIG. 3, cans are transferred into alternate pockets of the mandrel wheel assemble 10, as shown as black circles around the assembly 10. In this system, the mandrel loading time is compromised by loading cans at multiple locations.

The transfer shown in FIG. 3 uses tangential infeed which does entail a pitch change at the exchange point between the separator turret and mandrel wheel. An alternative would be to use a CV separator turret which would avoid the pitch change at exchange. Whilst not used on decorators at present, this alternative is considered to be within the scope of the present invention.

An iteration of the infeed system of FIG. 3 is to use a second infeed turret after each separator turret and a single combiner turret to combine the cans from the conveyor lanes. Thus in FIG. 4, there is shown infeed conveyors 24, 26 and associated separator turrets 25 and 27 respectively as in FIG. 3, plus second infeed turrets 28 and 29 respectively for each conveyor lane. In FIG. 4, cans from conveyor lane 1 (conveyor 24, separator turret 25 and second infeed turret 28) are denoted by a cross through the circle whereas cans from conveyor lane 2 (conveyor 26, separator turret 27 and second infeed turret 29) are denoted by a solid circle.

The combiner turret 30 is loaded with cans alternately from each conveyor lane so as to bring the conveyor lanes together on one turret. This combiner turret has the same pitch as that of the mandrel wheel assembly so that cans are transferred to the pockets of the mandrel wheel assembly without pitch change.

The system of FIG. 4 is considered by the Applicant to provide the best possible infeed to a can body decorator. The reduced speed of the conveyor stacks by virtue of using multiple lanes leads to an overall increase in machine production speed. Most importantly at exchange from the combiner turret to can carrier pockets in the mandrel wheel assembly, there is no pitch change hence can stability is optimum during mandrel loading. Each conveyor lane supplies a specific sequence of can carrier pockets on the mandrel wheel and mandrel loading time is not compromised.

The invention has been described above by way of example only but changes can be made without departing from the scope of the invention as defined by the claims.

The invention claimed is:

1. An infeed apparatus for supplying can bodies to a can body decorator, the infeed apparatus comprising:
    two or more conveyors for transporting undecorated can bodies from an upstream supply, each of the two or more conveyors defining a linear can pitch, respectively, each of the two or more conveyors having an accompanying separator turret for changing the linear can pitch of the respective conveyor to a first circular pitch of the respective separator turret, each of the two or more conveyors and respective separator turrets being adapted for providing an independent supply lane;
    each independent supply lane further including an infeed turret having a second circular pitch, the second circular pitch being different from the first circular pitch and the infeed turret being adapted to change the can bodies from the first circular pitch to the second circular pitch;
    a combiner turret on which the independent supply lanes are combined, the combiner turret configured to transfer can bodies to the mandrel wheel, the combiner turret having a third circular pitch; and
    a rotatable mandrel wheel for receiving each can body in a pocket on the circumference of the mandrel wheel, the mandrel wheel defining a fourth circular pitch, the fourth circular pitch being identical to the third circular pitch, such that each conveyor of the two or more conveyors is adapted for supplying a specific sequence of can carrier pocket of the mandrel wheel, whereby can stability is improved for loading and whereby can pitch between the two or more conveyors and mandrel wheel is changed in one or more stages and handling of the undecorated can bodies is controlled.

2. A method of feeding can bodies into a can body decorator, the method comprising:
    transporting undecorated can bodies in two or more infeed conveyors from an upstream supply, each conveyor having an accompanying separator turret, each conveyor and separator turret forming an independent conveyor lane, each independent conveyor lane including an infeed turret, wherein the transporting step comprises changing a linear pitch of the undecorated can bodies in the two or more conveyors to a first circular pitch of the respective separator turret thereby separating the undecorated can bodies;
    controlling handling of the undecorated can bodies;
    combining the undecorated can bodies from each independent conveyor lane together on a combiner turret, the combining step comprising changing the pitch of the undecorated can bodies to a second circular pitch of the combiner turret;
    receiving each undecorated can body in a pocket on the circumference of the mandrel wheel by supplying cans from the combiner turret directly to the mandrel wheel, the combiner turret having a circular pitch that is identical to that of the mandrel wheel, thereby staging can pitch changes between conveyor and mandrel wheel, whilst maintaining the circular pitch of can bodies on the combiner turret during transfer to can carrier pockets on the mandrel wheel, by selectively supplying can bodies from each conveyor lane to a specific sequence of can carrier pockets on the mandrel wheel.

3. An infeed apparatus for supplying can bodies to a can body decorator, the infeed apparatus comprising:
    at least two independent supply lanes, each independent supply lane comprising:

a conveyor configured to transport undecorated can bodies from an upstream supply, the conveyor defining a linear can pitch; and a separator turret having a first circular pitch, the separator turret configured to change the linear can pitch to the first circular pitch;

a combiner turret configured to combine the independent supply lanes, the combiner turret having a second circular pitch; and a rotatable mandrel wheel configured to receive each can body in a pocket on the circumference of the mandrel wheel, the mandrel wheel defining a third circular pitch, the third circular pitch being identical to the second circular pitch.

* * * * *